United States Patent
Nakano

(10) Patent No.: US 6,754,226 B1
(45) Date of Patent: Jun. 22, 2004

(54) COMMUNICATION SYSTEM IN AUDIO AND MUSIC DATA TRANSMISSION

(75) Inventor: Takehiko Nakano, Kanagawa (JP)

(73) Assignee: Sony Corporation, Tokyo (JP)

( * ) Notice: Subject to any disclaimer, the term of this patent is extended or adjusted under 35 U.S.C. 154(b) by 678 days.

(21) Appl. No.: 09/662,428

(22) Filed: Sep. 13, 2000

(30) Foreign Application Priority Data

Sep. 14, 1999 (JP) ............................................. 11-260909

(51) Int. Cl.[7] .............................................. H04J 3/22
(52) U.S. Cl. ........................ 370/466; 370/392; 710/315
(58) Field of Search ................................ 370/389, 392, 370/419, 420, 421, 464, 465, 466, 498, 529; 710/100, 105, 106, 110, 305, 315

(56) References Cited

U.S. PATENT DOCUMENTS

| | | | | |
|---|---|---|---|---|
| 5,613,096 A | * | 3/1997 | Danknick | 709/236 |
| 5,646,941 A | * | 7/1997 | Nishimura et al. | 370/389 |
| 5,973,748 A | * | 10/1999 | Horiguchi et al. | 348/554 |
| 6,211,800 B1 | * | 4/2001 | Yanagihara et al. | 341/50 |
| 6,219,697 B1 | * | 4/2001 | Lawande et al. | 709/221 |
| 6,233,637 B1 | * | 5/2001 | Smyers et al. | 710/311 |

FOREIGN PATENT DOCUMENTS

| | | |
|---|---|---|
| EP | 0 687 113 | 12/1995 |
| EP | 0 762 684 | 3/1997 |

OTHER PUBLICATIONS

1394 Trade and Association: "Audio and Music–Data Transmission Protocol, Version 1.0" Internet, 'Online! May 1997, XP002176033 Retrieved from the Internet: <URL:http://www.1394ta.org/Technology/Specifications/Specification.htm> 'retrieved on Dec. 19, 2003!.

* cited by examiner

*Primary Examiner*—Hassan Kizou
*Assistant Examiner*—D L Levitan
(74) *Attorney, Agent, or Firm*—Frommer Lawrence & Haug LLP; William S. Frommer; Darren M. Simon

(57) ABSTRACT

A transmission method and apparatus for detecting the format of data when data is absent from the transmission packets. In situations where data to be transmitted via a predetermined network (e.g., IEEE 1394) is absent (i.e., missing, incomplete, intentionally blank, or not ready to be transmitted), the transmission method allows for the format of the absent data to be determined by the receiving side. According to this transmission method, the data transmission packets include a label section that indicates the format of the data or the absence of data. When the label section indicates an absence of data, a label group section is included in the data transmission packet to indicate the format of the data which is absent. This allows the receiving side to determine the format of the data that it should be receiving.

20 Claims, 14 Drawing Sheets

FIG. 6

| Addr | Register |
|---|---|
| 900h | Output Master Plug Register |
| 904h | Output Plug Control Register #0 |
| 908h | Output Plug Control Register #1 |
| ⋮ | ⋮ |
| 97Ch | Output Plug Control Register #30 |
| 980h | Input Master Plug Register |
| 984h | Input Plug Control Register #0 |
| 988h | Input Plug Control Register #1 |
| ⋮ | ⋮ |
| 9FCh | Input Plug Control Register #30 |

FIG. 7A oMPR

| data rate capability | broadcast channel base | non-persistent extension field | persistent extension field | reserved | number of output plugs |
|---|---|---|---|---|---|
| 2 | 6 | 8 | 8 | 3 | 5 (bit) |

FIG. 7B oPCR[n]

| on-line | broadcast connection counter | point-to-point connection counter | reserved | channel number | reserved | data rate | overhead ID | payload |
|---|---|---|---|---|---|---|---|---|
| 1 | 6 | 6 | 2 | 6 | 2 | 2 | 4 | 10 (bit) |

FIG. 7C iMPR

| data rate capability | broadcast connection counter | non-persistent extension field | persistent extension field | reserved | number of input plugs |
|---|---|---|---|---|---|
| 2 | 6 | 8 | 8 | 3 | 5 (bit) |

FIG. 7D iPCR[n]

| on-line | broadcast connection counter | point-to-point connection counter | reserved | channel number | reserved |
|---|---|---|---|---|---|
| 1 | 6 | 6 | 2 | 6 | 16 (bit) |

FIG. 13

| Data Example of LABEL | |
|---|---|
| Value | Description |
| $00_{16} - 3F_{16}$ | IEC 60958 Conformance |
| $40_{16} - 43_{16}$ | Raw Audio |
| $44_{16} - 7F_{16}$ | Undefined |
| $80_{16} - 83_{16}$ | MIDI Conformance |
| 84 | Ext-No Data |
| $85_{16} - FF_{16}$ | Undefined |

COMMUNICATION SYSTEM IN AUDIO AND MUSIC DATA TRANSMISSION

BACKGROUND OF THE INVENTION

1. Field of the Invention

The present invention relates generally to a transmission method and transmission apparatus for transmitting data of various formats on a bus conforming to the IEEE 1394 standard.

2. Description of the Related Art

Networks using an IEEE 1394 bus can be used to connect a plurality of devices to transmit video data, audio data, and other types of data between the devices. IEEE 1394 standard buses are designed to use an isochronous transmission channel for transmitting large capacity data such as video and audio data, and an asynchronous transmission channel for transmitting control commands. Isochronous and asynchronous data are time division multiplexed on the bus. Details of the protocol for transmitting audio data (music data) on an IEEE 1394 standard bus are disclosed in "Audio and Music Data Transmission Protocol," IEC-PAS Publication 61883-6 (ed. 1.0 1998). This transmission protocol proscribes a label section at the head of each data packet to indicate the format of the data which follows.

However, this audio data transmission protocol only covers 16 and 24 bit format audio data with a fixed sampling frequency of 44.1 kHz. Numerous other audio data formats have been developed to further improve the sound quality. For example, several multi-channel digital audio formats have recently been proposed. Thus, there are a large number of formats for digital audio data transmission across an IEEE 1394 bus that are not addressed by the aforementioned transmission protocol. Furthermore, because there are so many different data formats and new formats are constantly being developed, not all devices can accept all of the available data formats.

In situations where audio data to be transmitted via an IEEE 1394 bus is absent (e.g., missing, incomplete, intentionally blank, or not ready to be transmitted), the present transmission protocol simply indicates the absence of data by placing an Ext-No DATA indicator in the label section of the data packet. In this situation, the label section does not indicate the format of the missing data. Hence, this protocol does not allow the receiving side to determine the format of the missing data. Knowing the format of the absent data is useful in detecting/anticipating changes between data formats (i.e., several formats may be transmitted in a time-division manner) and whether the various devices on the bus are compatible with the format.

Heretofore, only audio data formats have been discussed, but this problem applies equally to other types of data (e.g., video, text, pictures, etc . . . ).

OBJECTS OF THE INVENTION

It is therefore an object of the present invention to provide information to a data receiver for determining the format of data during a data absence state.

Other objects and advantages of the invention will in part be obvious and will in part be apparent from the specification and the drawings.

SUMMARY OF THE INVENTION

To achieve the above-mentioned object, a transmission method is presented for transmitting formatted data in predetermined length units between devices connected to a bus, in which when the data to be transmitted is not present, the transmission method includes the steps of disposing label data representing a data absence in a first section of the predetermined length unit; disposing data representing the format of the absent data, in a second section of the predetermined length unit; and transmitting the predetermined length unit. According to this transmission method, the format of the absent data can be distinguished on the basis of the data disposed in the second section.

A transmission apparatus according to the invention includes a data input for obtaining data; a data generator for dividing the data obtained by the data input means into units having a predetermined data length, disposing label data representing a scheme of the data in a head portion of each unit resulting from the division, the data generator disposing, in response to an absence of data input to the data input, label data representing the data absence and data representing the format of the absent data in predetermined sections, respectively; and a transmitter for sending out the data generated by the data generator onto a bus.

When desired data is not present, data transmitted from this transmission apparatus contains data representing the format of the data which is not present. According to a first aspect of a transmission method of the present invention, the format of the data which is not present is known from the data disposed in the second section. Thus, the receiving side knows what format data is not present. For example, the receiving side knows whether the absent data is audio data of such a format that the receiver can process data of that format. Then, when data to be transmitted is present, the receiving side is prepared to receive data of that format.

According to a second aspect of the present invention, data representing the format of the absent data is obtained by selecting a specific value from a plurality of values defined as label data for that format. As a result, the receiving side need only read the specific value to determine the format of the absent data.

According to a third aspect of the present invention, random data is disposed in a third section of the transmission data unit. Even if, for example, data absence states are consecutive, therefore, it becomes possible to disperse encrypted and transmitted data at random. As a result, the safety of the data transmission can be improved.

BRIEF DESCRIPTION OF THE DRAWINGS

For a more complete understanding of the invention, reference is made to the following description and accompanying drawings(s), in which:

FIG. 6 is a block diagram showing the detailed structure of the PCR shown in FIG. 5;

FIGS. 7A–D are block diagrams showing the detailed structure of the oMPR, oPCR, iMPR, and iPCR shown in FIG. 6;

FIG. 13 is a table showing example label data values for various data formats;

DETAILED DESCRIPTION OF PREFERRED EMBODIMENTS

Figure 1:
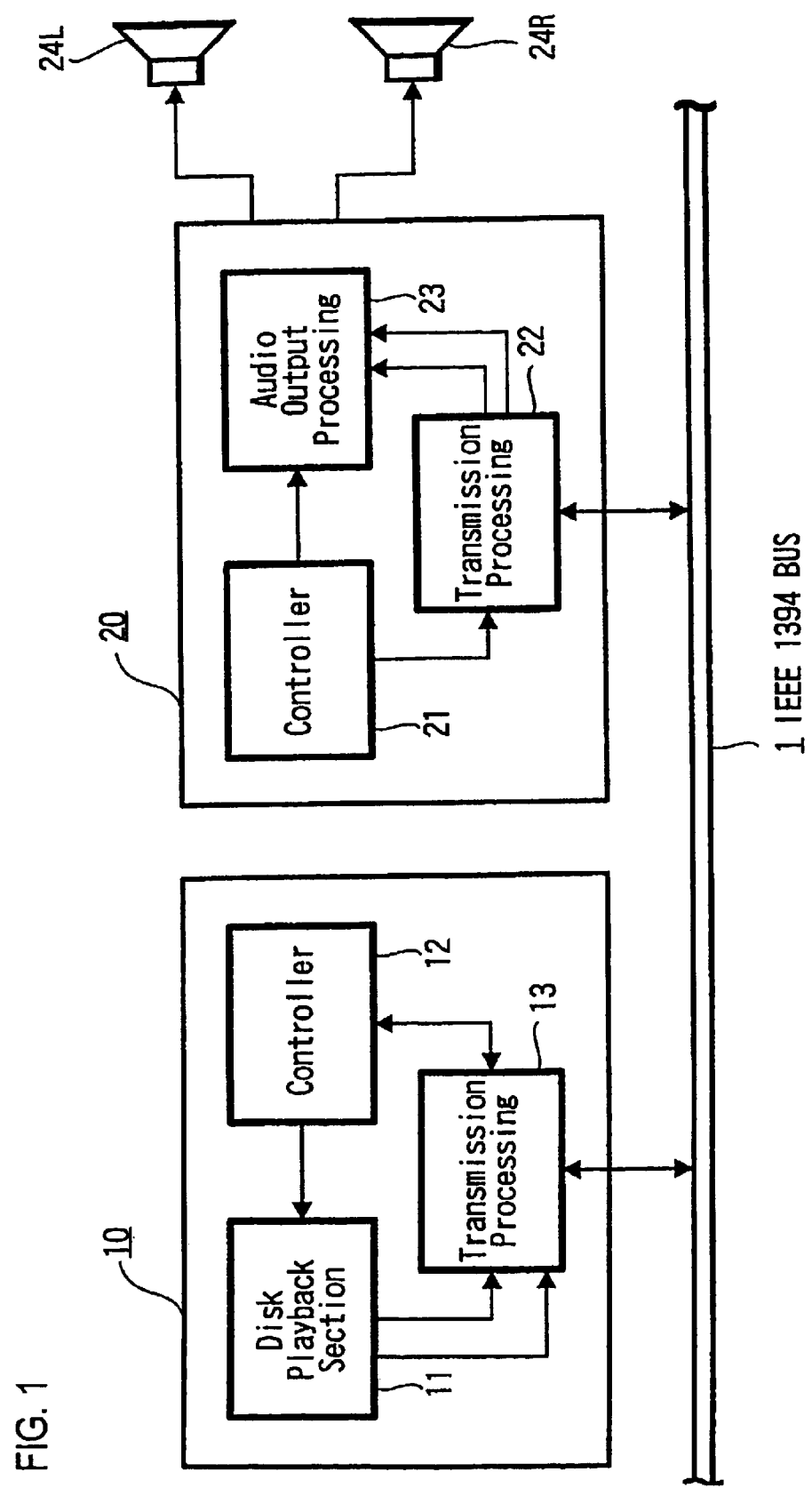
FIG. 1 is a block diagram showing a two node configuration for a system according to one embodiment of the present invention.

Embodiments of the invention will be described hereinafter by reference to the accompanying drawings. FIG. 1 shows an example of a configuration of a two node network system according to the present invention. A plurality of devices are connected to this network via a serial data bus employing the IEEE 1394 digital communication control bus standard. In FIG. 1, two devices 10 and 20 are connected to a bus 1. For example, device 10 is a disk playback device for playing a digital audio disk (CD) and device 20 is an amplifying device for processing and outputting digital audio data transmitted from the disk playback device through the bus and received by the amplifying device.

The disk playback device 10 includes a disk playback section 11, a controller 12 for controlling the disk playback in the disk playback section, and a transmission processing section 13 for sending digital audio data reproduced in the disk playback section to the bus. Transmission processing in the transmission processing section is also executed under the control of the controller.

The amplifying device 20 includes a controller 21 for controlling operation in the device, a transmission processing section 22 for receiving data transmitted over the bus, and an audio output processing section 23 for output processing. The output processing includes demodulation, analog conversion, and amplification of the audio data received by the transmission processing section. The amplifying device supplies an analog audio signal output from the audio output processing section to, for example, speaker devices 24L and 24R, i.e., left and right output channels. In this case, the audio output processing section is capable of performing analog conversion processing on digital audio data reproduced from an ordinary CD, and performing demodulation and analog conversion of compressed audio data in the SACD (super audio compact disc) format.

Further, devices 10 and 20 can control each other through use of the descriptor unit stipulated in the "AV/C Digital Interface Command Set General Specification," 1394 Trade Assoc., TA Doc. No. 1998003 (Ver. 3.0 Apr. 15, 1998). The descriptor allows devices 10 and 20 to access information stored in other units.

Devices 10 and 20 are also referred to as nodes and are designated by dynamically assigned node IDs set therein. When data is transmitted, the origination source and reception destination of the data is identified by node IDs. When a new device is connected to the bus, or when a connected device is disconnected, a bus reset is caused and the node IDs are reset. Thus, the node IDs of respective devices change based on the current configuration of the network.

Figure 2:
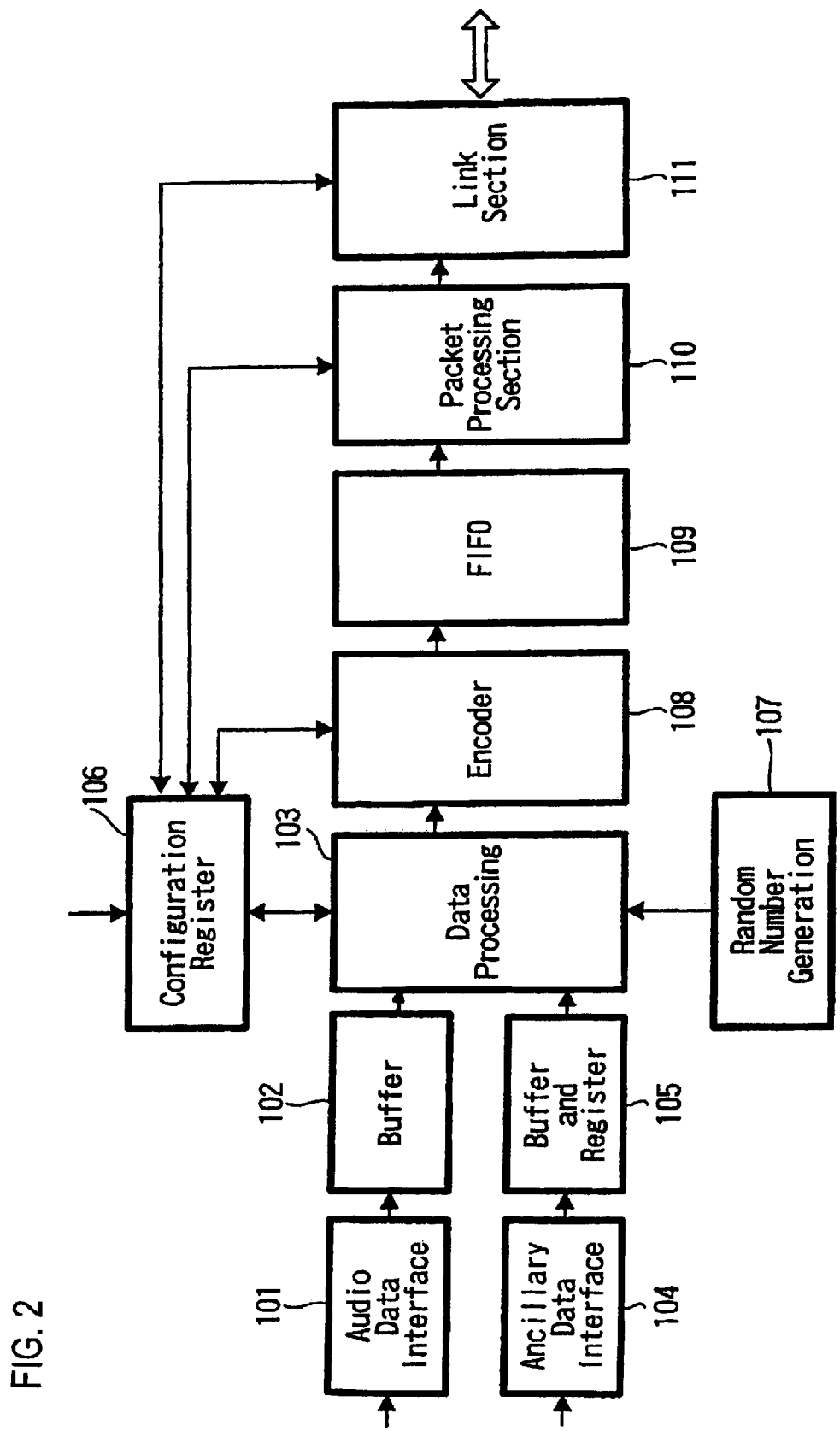
FIG. 2 is a block diagram showing the configuration of transmission processing section 13 of transmission node 10 shown in FIG. 1.
Figure 3:
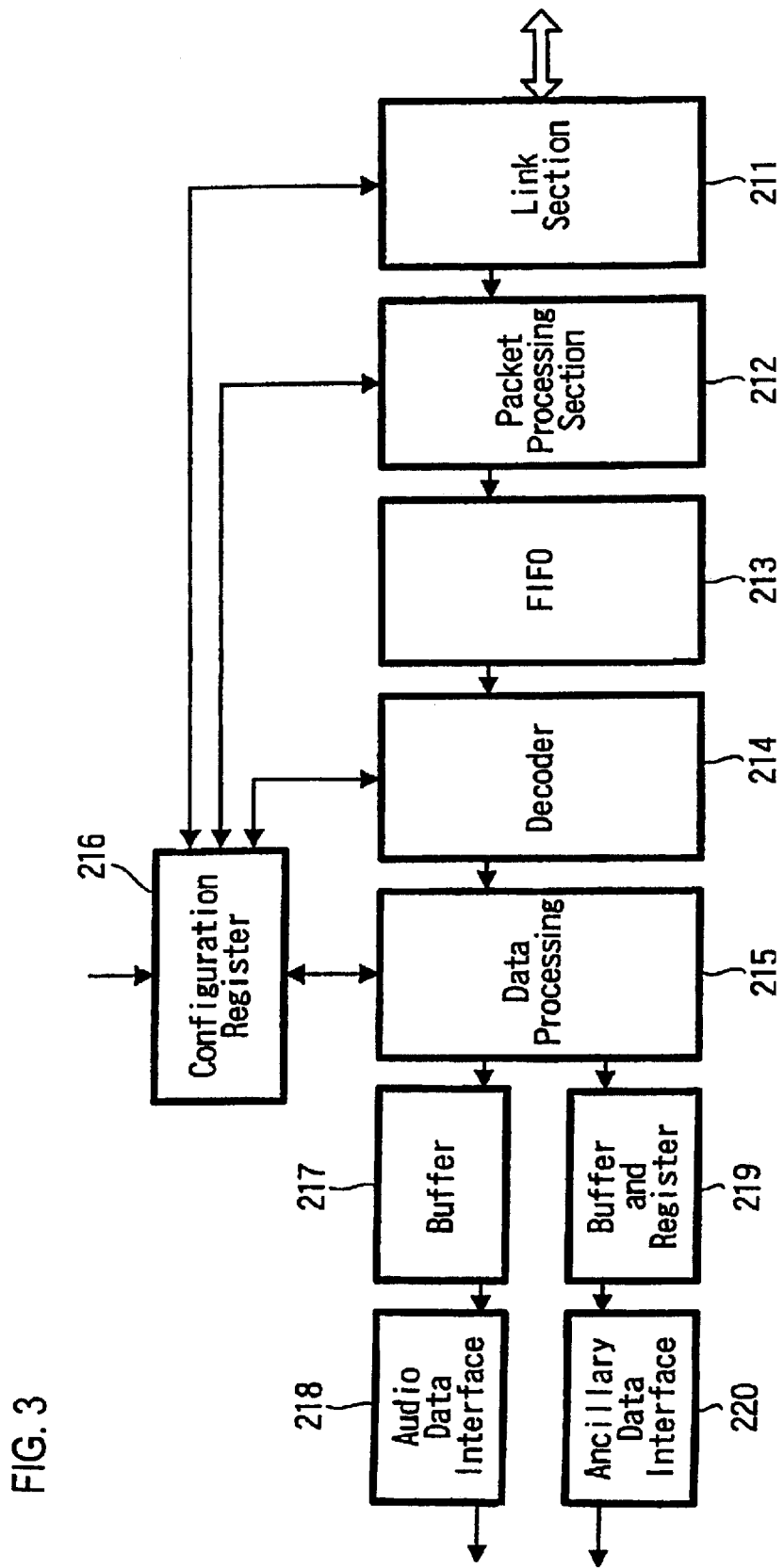
FIG. 3 is a block diagram showing the configuration of transmission processing section 22 of reception node 20 shown in FIG. 1.

FIGS. 2 and 3 show detailed configurations of the transmission processing sections 13 and 22 for devices 10 and 20, respectively. In order for data to be transmitted onto the bus, audio data is supplied from disk playback section 11 to audio data interface 101. The data is then transferred to data processing section 103 via buffer 102. Ancillary data annexed to the audio data is input to ancillary data interface 104. This data is supplied to data processing section 103 via buffer and register 105. The data processing section divides the input into data blocks each having a predetermined length. This data block forming process is controlled by the controller (12 or 21) by issuing commands via configuration register 106. Here, two units of audio data and two units of ancillary data are combined to form one data set. If any of the four units of data formed into the data set contain no data, the unit is handled as though in a data absence state (described hereinafter). The formed data set is supplied to encoder 108 that encodes the data (including encryption), and supplies the encoded data to packet processing section 110 via a first-in first-out (FIFO) memory 109 to generate packets for isochronous transfer. The generated packets are sent out from link section 111 onto the bus.

FIG. 3 shows the configuration of the transmission processing sections 13 and 22 when receiving data from the bus. Packet data is received from the bus by link section 211 and is decomposed by packet processing section 212. Data extracted from the packet is supplied to decoder 214, via FIFO memory 213. The decoder 214 decodes the supplied data (including decrypting the data) and supplies it to data processing section 215 to extract the audio data and ancillary data. Processing by data processing section 215 is controlled by controller 12 or 21, via configuration register 216. The audio data extracted in data processing section 215 is supplied to audio data interface 218, via buffer 217, and then passed onto audio output processing section 23. Furthermore, the ancillary data extracted in data processing section 15 is supplied to ancillary data interface 220, via buffer and register 219, and then passed onto audio output processing section 23.

If data processing section 215 determines a unit of data is in the data absence state, then no further processing occurs on that unit. However, if the absent data unit has added data representing the format of the missing data, then the data format is supplied to the controller (12 or 21) so that the device can prepare to receive data of that format.

Figure 4:
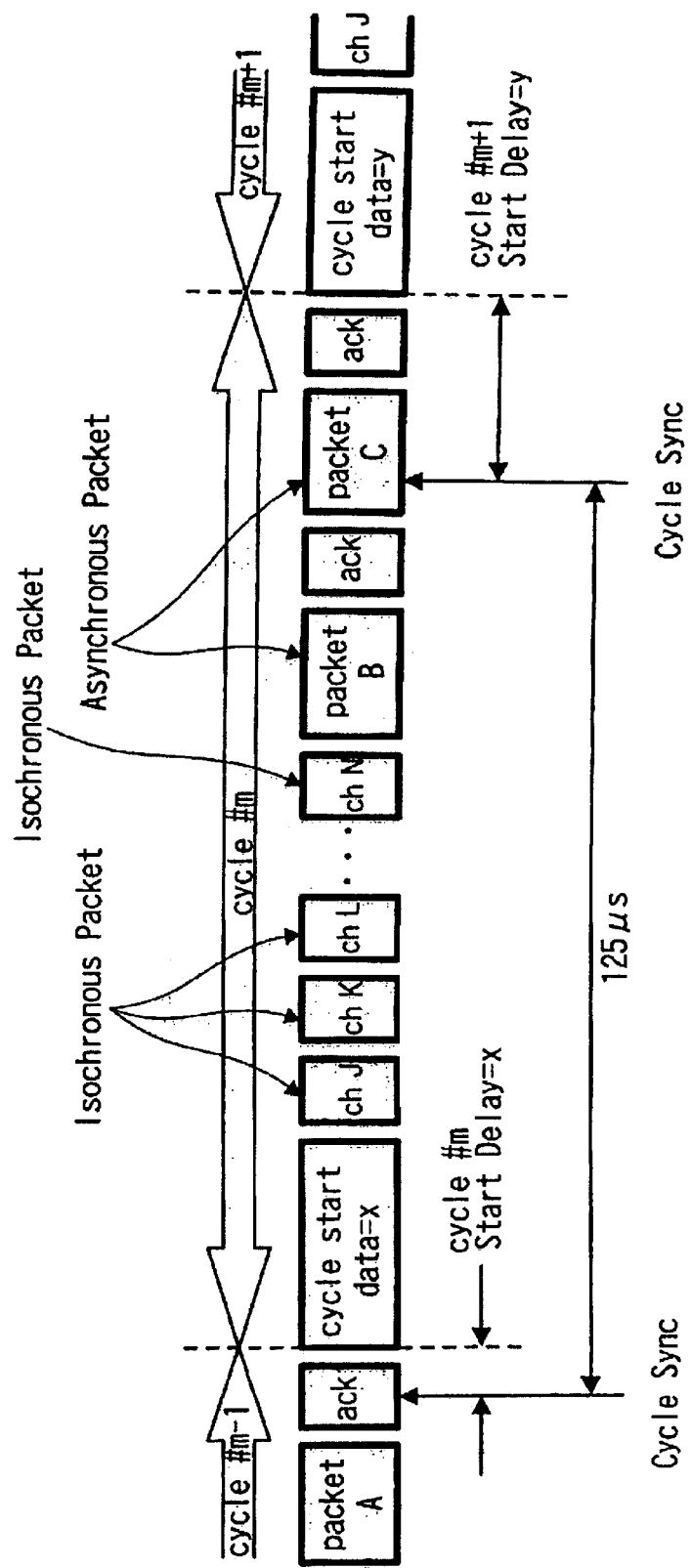
FIG. 4 is a block diagram showing the data packets in a communications cycle according to the IEEE 1394 standard.

Data transmission over an IEEE 1394 standard bus will now be described. FIG. 4 shows the structure of a communication cycle for data transmission by nodes connected to a bus in accordance with the IEEE 1394 standard. The signal transmission is started when a device called a cycle master (an arbitrarily designated device on the bus) sends a cycle start packet indicating that a communication cycle should be started. There are two kinds of data packets: isochronous (Iso) packets for transmitting real-time data, such as video data or audio data, and asynchronous (Async) packets for transmitting control commands and ancillary data. In each communication cycle the iso packets are transmitted before the Async packets. Iso packets within each communication cycle are respectively provided with individual channel numbers 1, 2, 3, . . . , n so as to make the packets distinguishable. Any interval between the end of the communication of Iso packets and the next cycle start packet is used for transmission of Async packets. Therefore, the interval during which Async packets can be transmitted varies according to the number of Iso packets being sent. A predetermined number of channels (or bands) are reserved for Iso packets in every communication cycle. However, there is no confirmation from the reception side that all the Iso packets were received. Whereas, for the Async packets an acknowledgment (Ack) is returned from the reception side that all Async packets were received. Thus, the asynchronous transmission ensures secure transmission by using acknowledge and retry signals, but the transmission timing is uncertain. Furthermore, at least one of the devices connected to the IEEE 1394 serial bus must have an isochronous-resource-manager function.

Figure 5:
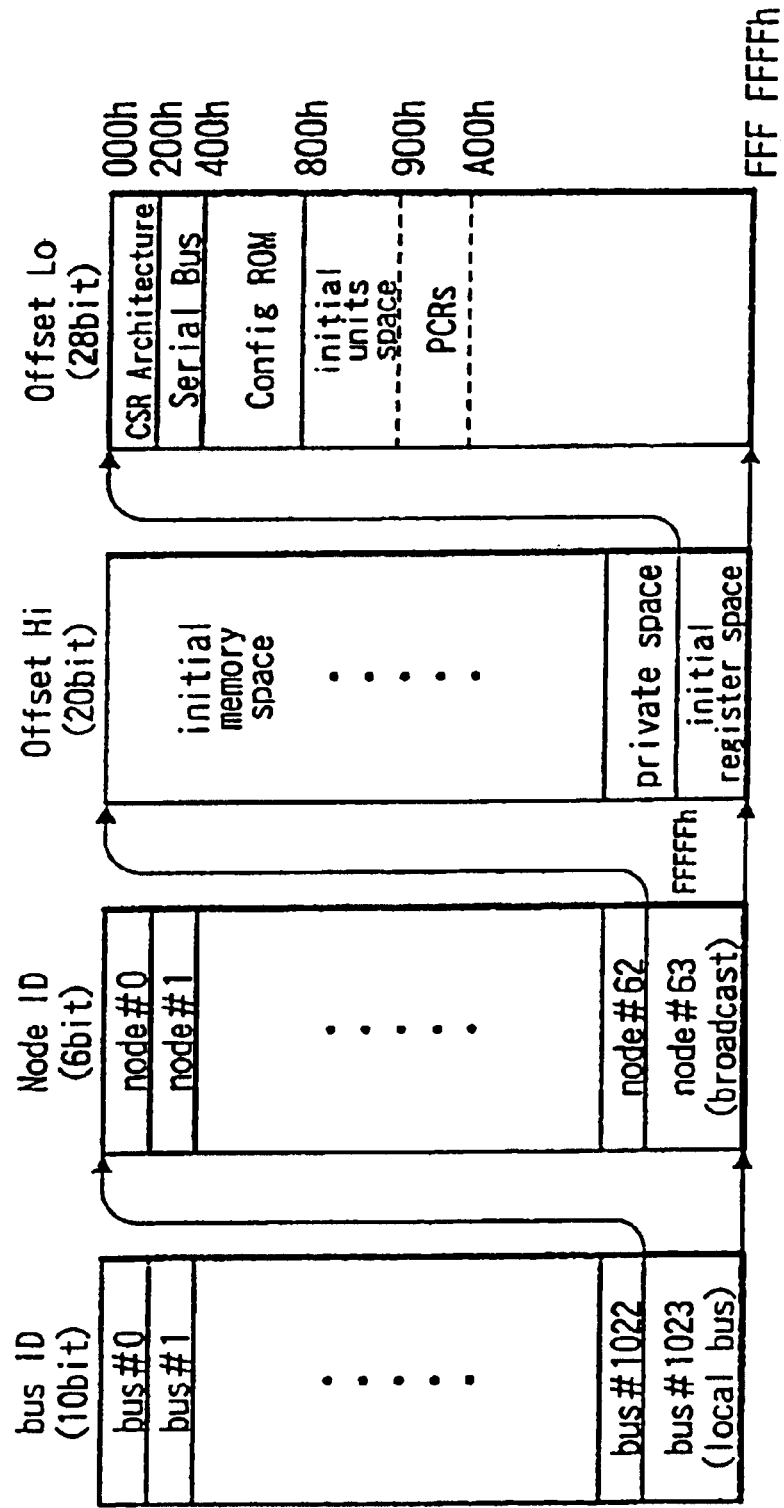
FIG. 5 is a diagram showing the structure of the address space according to the CSR architecture.

The IEEE 1394 is based upon a CSR (Control & Status Register) architecture having an address space of sixty-four bits defined by ISO/IEC 13213. FIG. 5 illustrates the structure of the address space in accordance with the CSR architecture. High order sixteen bits form a node ID indicating each device on the IEEE 1394 bus. These high order sixteen bits are further divided into ten bits of bus ID and six bits of physical ID (node ID). This allows the standard to specify up to 1,023 buses and 63 nodes. The remaining forty-eight bits are used for specifying the address space for that device.

The space defined by the upper twenty bits of the address space (Offset Hi) is divided into a 2,048 bit Initial Register Space, a Private Space, and an initial Memory Space. The space defined by the lower twenty-eight bits (Offset Lo) is divided into a Configuration Read Only Memory, an initial Unit Space, and Plug Control Registers (PCRs).

While each device has the CSR architecture shown in FIG. 5, only devices containing an isochronous resource manager have a valid bandwidth available register. The bandwidth available register tracks the number of channels allocated for isochronous communication. Each bit between offset 224$h$ and 228$h$ corresponds to channel numbers 0 to 63, respectively. If a bit is set to zero, it indicates that the channel has already been allocated.

The input and output of each device is controlled by the PCRs (Plug Control Registers), defined by IEC 61883 in addresses 900 h to 9FFh within the initial Unit Space shown in FIG. 5. The PCR is essentially used to logically configure the signal paths, similar to that of an analog interface. FIG. 6 illustrates the structure of a PCR. The PCR comprises an oPCR (output Plug Control Register) representing an output plug and an iPCR (input Plug Control Register) representing an input plug. Moreover, the PCR has an oMPR (output Master Plug Register) and an iMPR (input Master Plug Register) for indicating unique information on the output plug or input plug for that device. Each device is capable of having, but does not necessarily have, a plurality of oMPRs and iMPRs corresponding to each individual plug. The PCR shown in FIG. 6 has thirty-one oPCRs and iPCRs, respectively. The flow of isochronous data is controlled by operation of the register corresponding to these plugs.

FIGS. 7A to 7D show the structure of the oMPR, oPCR, iMPR and iPCR, respectively. The leftmost two bits—on the MSB side—of the oMPR and iMPR store a code indicating the maximum transmission speed for isochronous data which can be transmitted or received by that device. The broadcast channel base area of the oMPR proscribes the channel number used to broadcast output. The number of output plugs area—the rightmost five bits on the LSB side of the oMPR—stores a value indicating the number of output plugs owned by that device, namely, the number of oPCRs. Likewise, the number of input plugs area-the rightmost five bits on the LSB side of the iMPR—stores a value indicating the number of input plugs owned by that device, namely, the number of iPCRs. The non-persistent extension field and the persistent extension field are reserved for future versions of the CSR architecture.

The on-line areas of the oPCR and iPCR show the state of use of the plug. In other words, a value of 1 shows that the plug is on-line and a value of 0 shows that the plug is off-line. The value of the broadcast connection counters of the oPCR and iPCR indicate whether the broadcast connection is present (1) or not (0). The value of the point-to-point connection counters of the oPCR and iPCR indicate the number of point-to-point connections owned by that plug. The value of the channel number areas of the oPCR and iPCR indicate the isochronous channel number to which that plug is connected. The value of the data rate area of the oPCR indicates the actual transmission speed of isochronous data packets output by that plug. The code stored in the overhead ID area of the oPCR represents the overhead bandwidth for isochronous communications. The value of the payload area of the oPCR represents the maximum value of data which that plug can handle.

Figure 8:
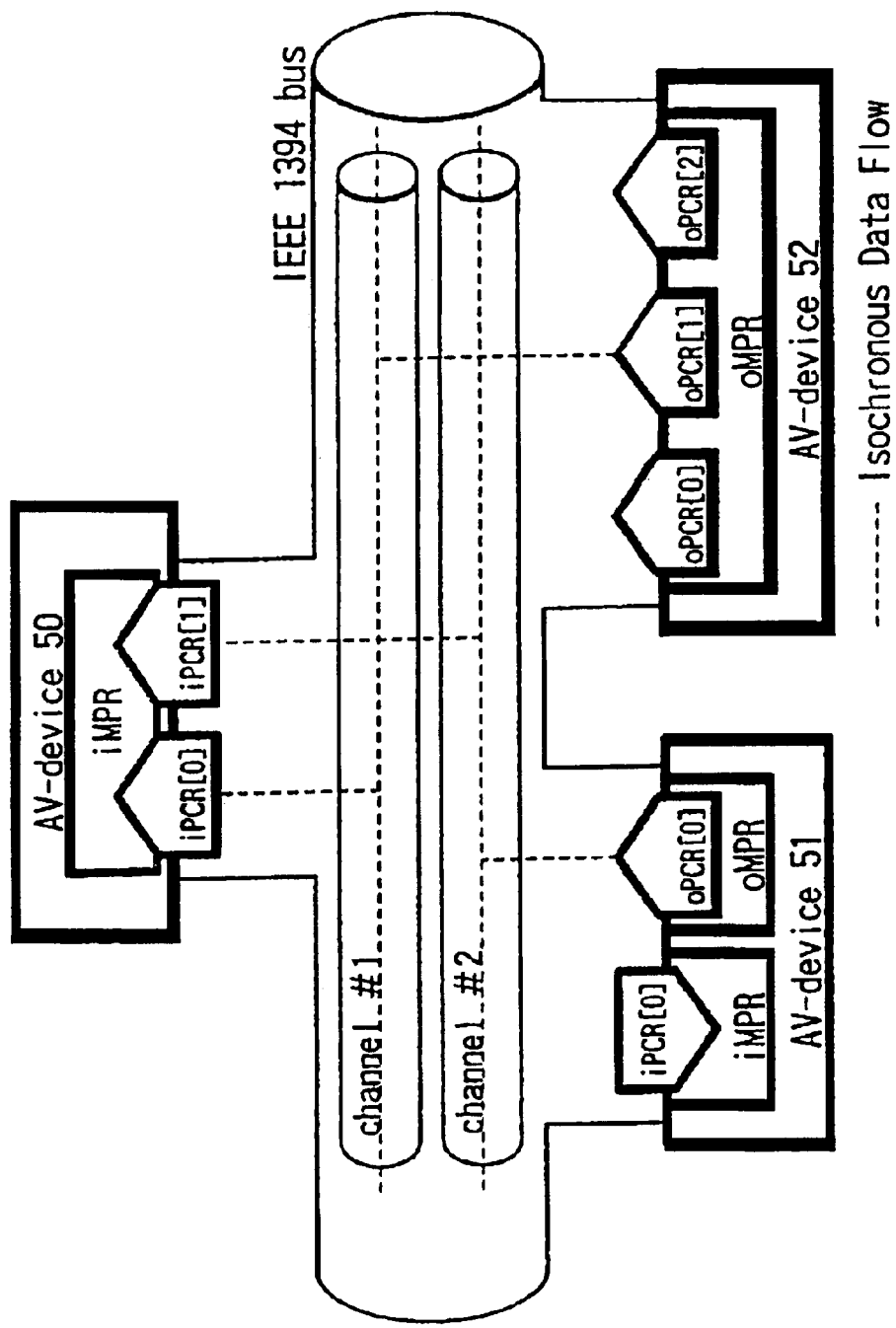
FIG. 8 is a diagram illustrating the relation between the plug, the plug control register and the isochronous channel.

FIG. 8 shows the relation between the plug, the plug control register and an isochronous channel. AV-devices 50 to 52 are connected to each other by means of the IEEE 1394 serial bus. The isochronous data whose channel is designated by OPCR[I] in AV-device 52 is sent out to channel number of the IEEE 1394 serial bus. AV-device 50 reads and stores the isochronous data sent out on channel number 1. Likewise, AV-device 51 sends out isochronous data to channel number 2, as specified by oPCR [0], and AV-device 50 reads the isochronous data from channel number 2, as specified by iPCR [1], and stores it.

Figure 9:
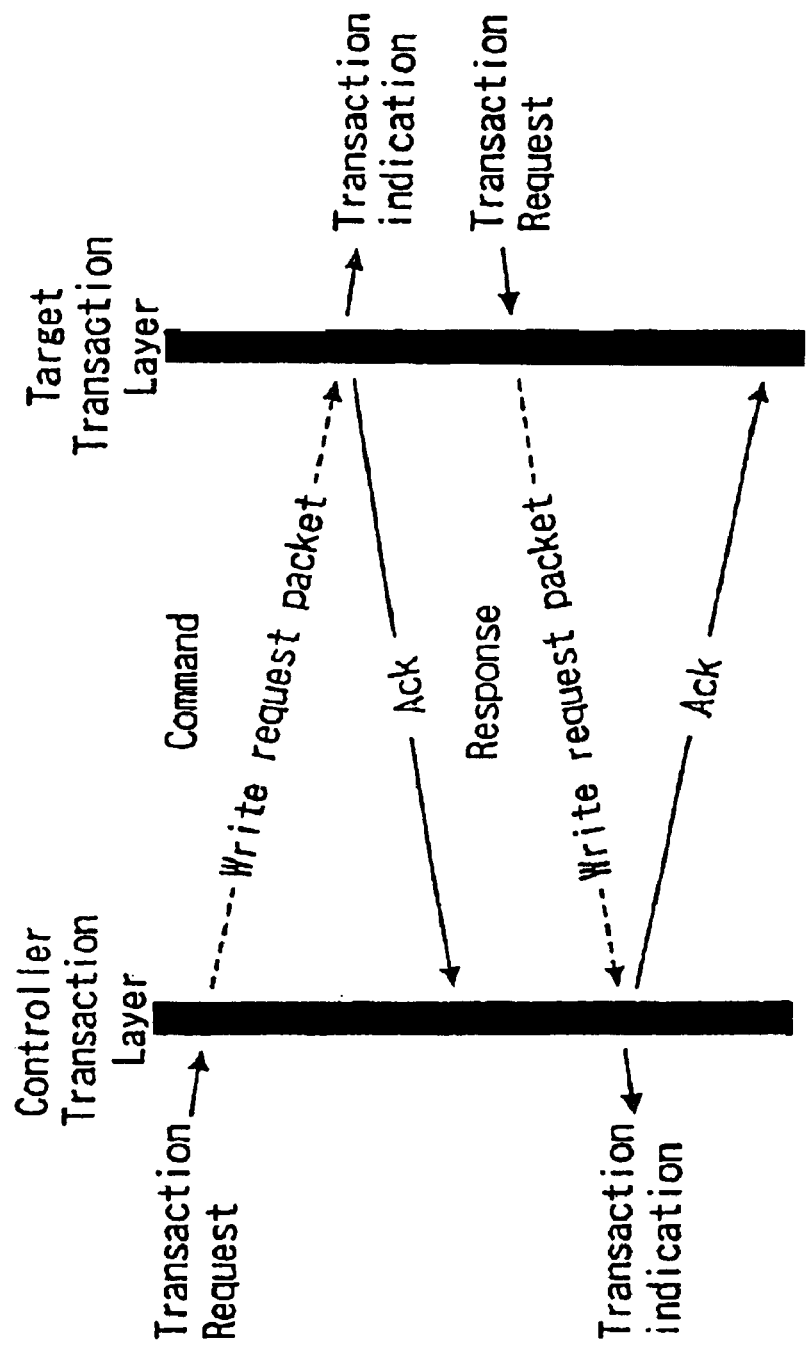
FIG. 9 is a diagram illustrating a control command and response that are transmitted asynchronously.

Next, the AV/C command set employed by the audio system shown in FIG. 1 will be described with reference to FIGS. 9 and FIG. 10. FIG. 9 illustrates a control command and response that are transmitted asynchronously. Transmission and response of control commands is performed between devices using asynchronous write transactions. The target which receives data returns an acknowledgement (ACK) to the controller confirming reception.

Figure 10:
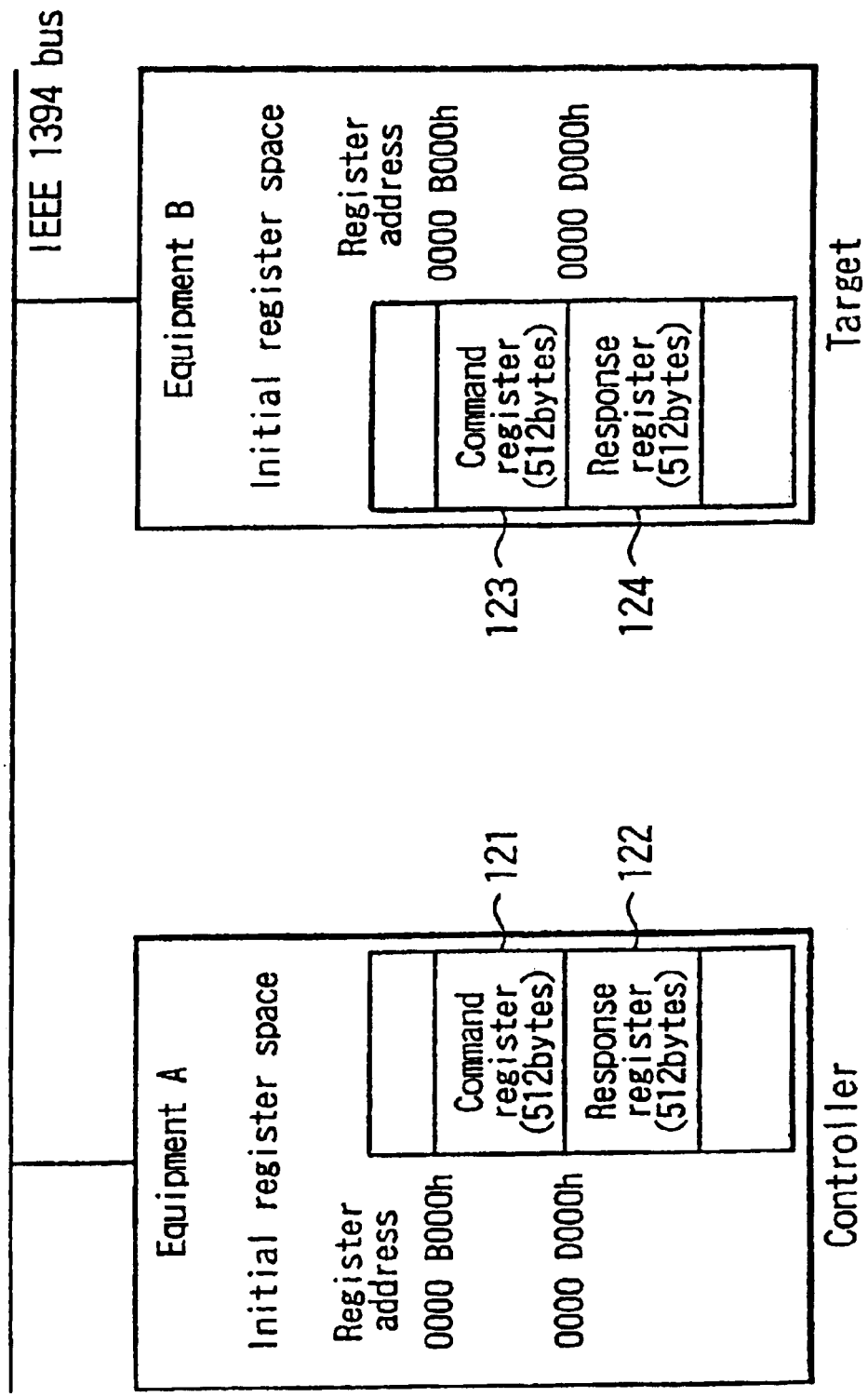
FIG. 10 is a block diagram showing the command and response registers for two nodes.

FIG. 10 illustrates in more detail the relation between control commands and their responses. An equipment (device) A is connected with an equipment B through the IEEE 1394 bus. Equipment A is the controller and equipment B is the target. Equipment A and equipment B both have a command register and a response register each of which is 512 bytes, respectively. As shown in FIG. 10, the controller communicates commands by writing a command message into the command register 123 of the target. Conversely, the target communicates the response by writing a response message into the response register 122 of the controller. The control information thus exchanged makes a matched pair.

Figure 11:
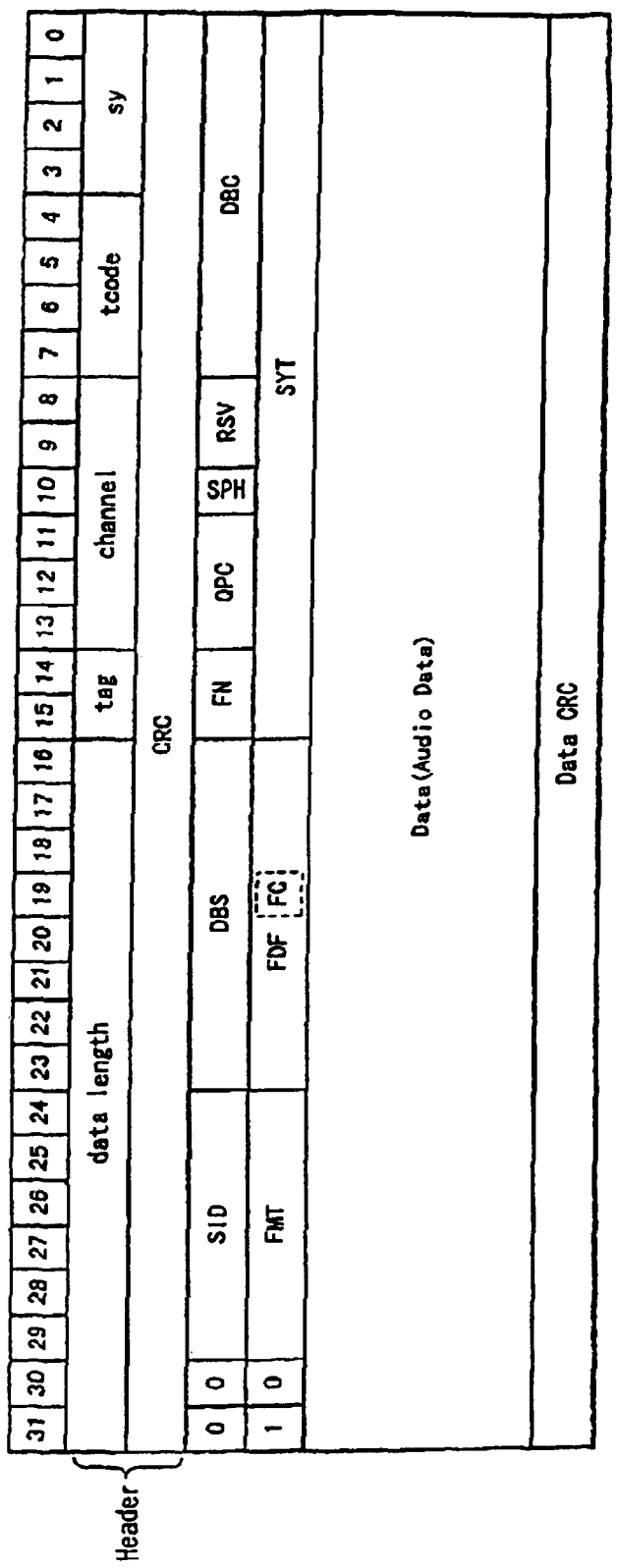
FIG. 11 is a block diagram showing the data structure of an isochronous transfer packet.

FIG. 11 is a diagram showing an isochronous transfer packet used for the aforementioned isochronous transfer. A header is assigned to this packet, which occupies 32×2 bits and includes synchronizing pattern sy, packet code tcode, channel, tag, data length and error correction code CRC. The subsequent 32 bits are divided into data block code DBC, reserve RSV, marker SPH (indicating whether there is a source packet header or not), divisional number of source packet FN, data block size DBS, identification code SID, etc ... The next 32 bits are assigned as recording area SYT (such as a time stamp), sampling frequency FDF, and transmission format FMT. The next area contains the transmitted data divided into 32 bit units, with an error correction code CRC at the end.

Additionally, one bit of the sampling frequency FDF is used for adding a flag FC indicating that the transmission rate of the audio signal is being controlled. If flag FC is "1", it indicates a mode in which the transmission rate is controlled. In the following description, modes in which the transmission rate is controlled will be referred to as flow control modes.

Figure 12:
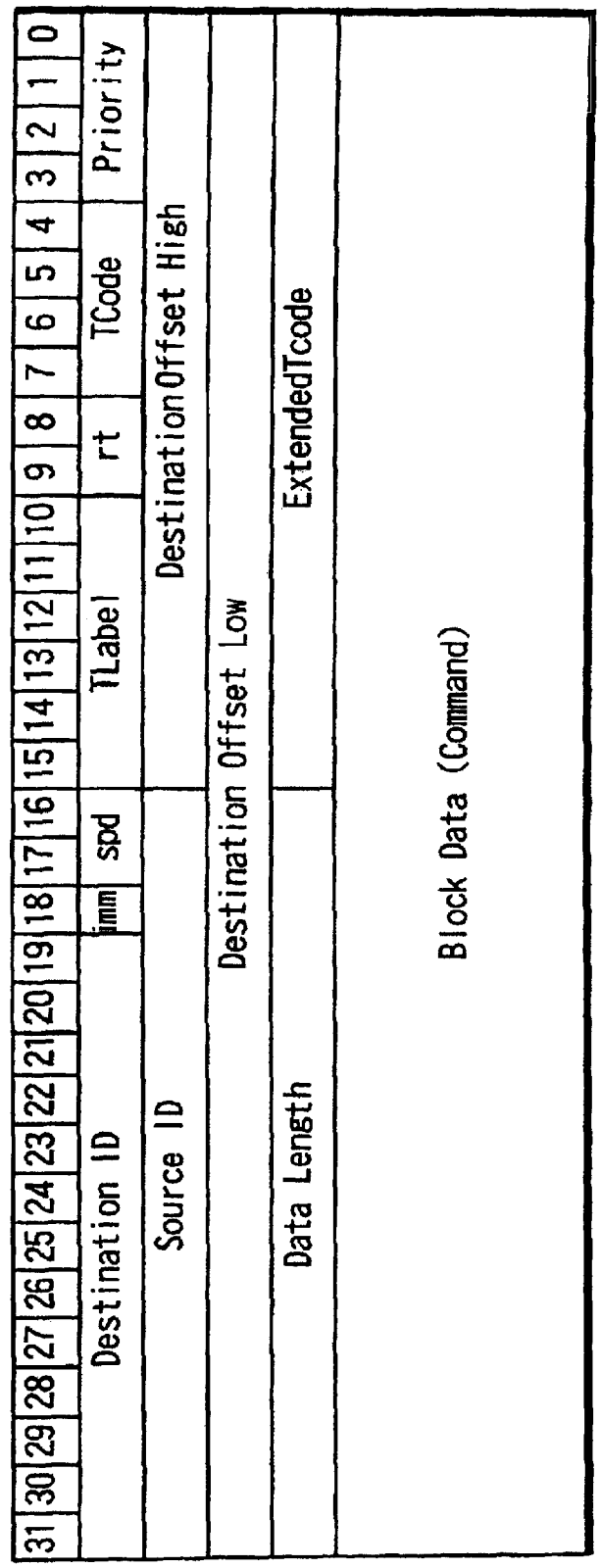
FIG. 12 is a block diagram showing the data structure of an asynchronous transfer packet.

FIG. 12 is a diagram showing an asynchronous transfer packet. Input-output circuit 10 sets the address (i.e., indicating its own node and bus number) on the packet and sends it out. Specifically, the first 32 bits of the packet are assigned as the priority level (priority), code of this packet (Code t), retry code of this packet (rt), label assigned to this packet (Label t), transmission speed (spd) and identification data indicating the relation to successive packets (imm). Moreover, data specifying the address of the destination node (destination Offset High, destination Offset Low), data indicating the destination node and bus (destination ID), and the data length of the transmission data (data Length) are assigned. Next, the transmission data is assigned in 32 bits units.

The data configuration when audio data is reproduced from a disk in disk playback device 10, transmitted to amplifying device 20 via bus 1, and reproduced from speaker devices 24L and 24R connected to amplifying device 20 will now be described by referring to FIG. 11. When transmitting audio data via bus 1, the audio data is transmitted in isochronous transmission mode using an arbitrary channel. FIG. 11 shows the configuration of a header portion of an Iso packet. This packet is formed so that data transmission is conducted in 32 bit units. Each header portion is formed of two units (i.e., 64 bits). The value of the FMT section indicates that the data is audio data (music data). Furthermore, the value of the FDF section indicates which format the audio data is in.

Figure 14:
FIG. 14 is a diagram showing the configuration of transmission data according to an embodiment of the present invention.

Data following this header portion is configured into 32-bit units as shown in FIG. 14. An 8-bit section of the 32-bit unit contains the label data (LABEL). In the 24-bit section following the LABEL, the audio data is disposed. When transmitting audio data from an ordinary CD, audio data of each sample is disposed in 16 bits among the 24 bits. When ancillary data is transmitted it is so indicated in the LABEL. Ancillary data for audio data is generally comprised of text lyrics, liner notes, and the jacket cover picture.

FIG. 13 shows a table of label data values corresponding to various audio data types (formats) defined by the standards of IEC 60958. Here, the value of the 8-bit label data is represented as a 2-digit hexadecimal value. The table shows LABEL values for raw audio data which is not processed, MIDI data (commonly used for digital musical instruments), and an Ext-No data vaue indicating a data absence. It is also possible to assign the undefined value to different audio data formats not covered in the table. Furthermore, although not illustrated in FIG. 13, a value representing ancillary data is also defined. As shown in FIG. 13, each audio data format is defined by a range of values. Which specific value among the range of defined values is used as the label data is decided according to the data state at the time of transmission.

The configuration of data transmitted when there is no data to be transmitted (i.e., when there is no input of audio data in the transmission processing section) will now be described by referring to FIG. 15. When there is no data to be transmitted, the Ext-No data value is placed in the LABEL section to indicate the data absence. Following the LABEL section, an 8-bit label group (LABEL-Gp.) section is disposed. The format of the data that is absent is indicated in this label group section. For example, the label value for that format of audio data, as shown in FIG. 13, is disposed in the LABEL-Gp. section. Since the label data is defined as a range of values, the minimum value of the range is used. For example, assume that digital audio data defined by the standards of IEC 60958 is being transmitted and that the audio data becomes absent temporarily. At this point, the Ext-No data value (hex 84) is disposed in the LABEL section located at the head of the unit, and 00 which is the minimum value among values 00–3F (as defined for IEC 60958 data) is disposed in the following 8-bit LABEL-Gp section. Note, the present invention uses the minimum value for exemplary purposes only. For example, the maximum value could also be used. Furthermore, in the case where ancillary data is absent, a value defined as label data for the ancillary data is used for the LABEL-Gp.

Figure 15:
FIG. 15 is a diagram showing the configuration of transmission data during an absence of data according to an embodiment of the present invention.

In the remaining 16-bit section of the 32-bit unit shown in FIG. 15—randomly generated data is disposed. In other words, a 16-bit random number value is generated by random number generation section 107, shown in FIG. 2, and is disposed in this section to fill out the isochronous transfer packet for transmittal.

Thus, when audio data or ancillary data to be transmitted is absent, not only is the fact that data is absent transmitted, but also the form of the absent data is transmitted. As a result, the reception side can determine which data is absent and anticipate the resumption of data transmission.

Furthermore, the randomly generated fill data means that whole units are transmitted. This makes attempts to decrypt and pirate the data by looking for data absent units more difficult.

The data configuration shown in FIG. 15 was used for exemplary purposes. The present invention is not limited to such a configuration. For example, in the example of FIG. 15, label data representing data absence is disposed in the label data section and data representing the data kind is disposed in the following section. However, this data may be disposed in other sections.

Furthermore, in the data configuration shown in FIG. 15 random data is disposed in the remaining section, other than the LABEL and LABEL Gp. sections. However, random data may be disposed in only a part of the section. Furthermore, instead of disposing random data, fixed values may be disposed in the remaining section.

In the above embodiment, the case where audio data reproduced from a disk playback device connected to an IEEE 1394 standard bus is transmitted to an amplifying device has been described. It is a matter of course that a data transmission path of a scheme other than the bus line of the IEEE 1394 standard may be used. For example, the embodiment can also be applied where audio data input to an device is transmitted to another device via a different type of bus.

In the above described embodiment, processing conducted in the case where the audio data is not present temporarily when transmitting audio data has been described. However, the embodiment can also be applied to the case where other stream data is transmitted. For example, in the case where video data is not present temporarily when transmitting video data, label data and label group data having a similar configuration may be disposed.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

What is claimed is:

1. A data sending method for sending a data packet of a predetermined length between a plurality of devices coupled to a bus; wherein when data to be sent is absent, said data sending method comprises the steps of:
   disposing first information in a first section of said data packet indicating the absence of data;
   disposing second information in a second section of said data packet indicating the format of the absent data; and
   sending said data packet of said predetermined length on the bus.

2. The data sending method according to claim 1, wherein said second information is a specific value selected from a predefined range of values to indicate the format of the absent data.

3. The data sending method according to claim 2, wherein said specific value selected is the smallest value from said predefined range of values.

4. The data sending method according to claim 1, further comprising the steps of:
   generating random data; and
   disposing the random data in a third section of said data packet.

5. The data sending method according to claim 1, further comprising the steps of:
   generating predetermined data; and
   disposing the predetermined data in a third section of said data packet.

6. The data sending method according to claim 4, wherein the data to be sent is encrypted.

7. The data sending method according to claim 1, further comprising the step of receiving said data packet sent on said bus.

8. The data sending method according to claim 1, wherein said data packet is incorporated into the data portion of an isochronous data packet.

9. A transmission apparatus for transmitting a data packet of a predetermined length on a bus, comprising:
   an input for inputting transmitting data;
   a detector for detecting whether transmitting data has been input to said input means;
   first disposing means for disposing first information in a first section of said data packet; said first information indicating the absence of said transmitting data if said detecting means detects no transmitting data has been input;
   second disposing means for disposing second information in a second section of said data packet if said detector detects no transmitting data has been input; said second information indicating the format of the absent data; and
   a transmitter for transmitting said data packet of predetermined length on the bus.

10. The transmission apparatus according to claim 9, wherein said second disposing means comprises:
   a store for storing a plurality of predefined value ranges indicating the various formats of transmitting data that can be transmitted by said transmission apparatus; and
   a selector for selecting as the second information a specific value from said predefined value range corresponding to the format of the absent transmitting data.

11. The transmission apparatus according to claim 10, wherein the specific value selected by said selector is the smallest value from said predefined value range.

12. The transmission apparatus according to claim 9, further comprising:
   a random data generator for generating random data; and
   third disposing means for disposing the random data in a third section of said data packet if said detector detects no transmitting data has been input.

13. The transmission apparatus according to claim 9, further comprising:
   a predetermined data generator for generating predetermined data; and
   third disposing means for disposing the predetermined data in a third section of said data packet if said detector detects no transmitting data has been input.

14. The transmission apparatus according to claim 12, further comprising an encrypter for encrypting said transmitting data.

15. The transmission apparatus according to claim 9, further comprising:
   a receiver for receiving said data packet from said bus;
   a reproducer for reproducing said transmitting data from the received data packet; and
   an output for outputting the reproduced transmitting data to an external device.

16. The transmission apparatus according to claim 9, wherein said data packet is incorporated into the data portion of an isochronous data packet.

17. A data receiving method for receiving a data packet of a predetermined length from a bus, comprising the steps of:
   receiving said data packet from said bus;
   determining whether a first information in a first section of said data packet indicates the absence of data in said data packet;
   determining a second information from a second section of said data packet when said first information indicates the absence of data; said second information indicating the format of the absent data; and
   configuring a receiver to receive data in subsequent data packets of the format indicated by the second information when said first information indicates the absence of data.

18. A data receiving apparatus for receiving a data packets of a predetermined length from a bus, comprising:
   a receiver for receiving data from said bus;
   first determining means for determining whether a first information in a first section of said data packet indicates the absence of data in said data packet;
   second determining means for determining a second information from a second section of said data packet when said first information indicates the absence of data; said second information indicating the format of the absent data; and
   configuration means for configuring said receiver to receive data in subsequent data packets of the format indicated by the second information when said first information indicates the absence of data.

19. A transmission method for transmitting a data packet of a predetermined length between a plurality of devices coupled to a bus; wherein when data to be transmitted is absent, said transmission method comprises the steps of:
   disposing first information in a first section of said data packet indicating the absence of data;

disposing second information in a second section of said data packet indicating the format of the absent data;

transmitting said data packet of said predetermined length from a first device coupled to said bus;

receiving the transmitted data packet at a second device coupled to said bus;

determining whether said first information in said first section of the received data packet indicates the absence of data in said data packet;

determining said second information from said second section of said data packet when said first information indicates the absence of data; said second information indicating the format of the absent data; and configuring said second device to receive data in subsequent data packets of the format indicated by the second information when said first information indicates the absence of data.

20. A transmission system for transmitting a data packet of a predetermined length on a bus, comprising:

an input for inputting transmitting data;

a detector for detecting whether said input means has transmitting data to be transmitted;

first disposing means for disposing first information in a first section of said data packet; said first information indicating the absence of said transmitting data if said detector detects no transmitting data has been received;

second disposing means for disposing second information in a second section of said data packet if said detector detects no transmitting data has been received; said second information indicating the format of the absent data; and a transmitter for transmitting said data packet of predetermined length on the bus;

a receiver for receiving the transmitted data packet from the bus;

first determining means for determining whether said first information in said first section of the received data packet indicates the absence of data in said data packet;

second determining means for determining said second information from said second section of said data packet when said first information indicates the absence of data; said second information indicating the format of the absent data;

configuration means for configuring said receiver to receive data in subsequent data packets of the format indicated by the second information when said first information indicates the absence of data.

* * * * *